US008878913B2

(12) United States Patent
Eyer (10) Patent No.: US 8,878,913 B2
(45) Date of Patent: Nov. 4, 2014

(54) EXTENDED COMMAND STREAM FOR CLOSED CAPTION DISPARITY

(75) Inventor: Mark Kenneth Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 478 days.

(21) Appl. No.: 13/022,810

(22) Filed: Feb. 8, 2011

(65) Prior Publication Data
US 2011/0221873 A1 Sep. 15, 2011

Related U.S. Application Data

(60) Provisional application No. 61/415,924, filed on Nov. 22, 2010, provisional application No. 61/415,457, filed on Nov. 19, 2010, provisional application No. 61/346,652, filed on May 20, 2010, provisional application No. 61/313,612, filed on Mar. 12, 2010, provisional application No. 61/316,733, filed on Mar. 23, 2010, provisional application No. 61/378,792, filed on Aug. 31, 2010.

(51) Int. Cl.
*H04N 7/00* (2011.01)
*H04N 13/04* (2006.01)
*H04N 21/81* (2011.01)
*H04N 13/00* (2006.01)
*H04N 21/488* (2011.01)

(52) U.S. Cl.
CPC ............ *H04N 13/007* (2013.01); *H04N 21/816* (2013.01); *H04N 13/0062* (2013.01); *H04N 21/4884* (2013.01)
USPC ............................................. 348/51; 348/468

(58) Field of Classification Search
CPC ................................. H04N 7/00; H04N 13/04
USPC ..................................................... 348/51, 468
See application file for complete search history.

(56) References Cited

U.S. PATENT DOCUMENTS 5,200,823 A 4/1993 Yoneda et al.
7,848,425 B2 12/2010 Cho et al.
(Continued)

FOREIGN PATENT DOCUMENTS

| WO | 2009/029278 A1 | 3/2009 |
| WO | 2010/010499 A1 | 1/2010 |
| WO | 2010/064853 A2 | 6/2010 |
| WO | 2010/085074 A2 | 7/2010 |

OTHER PUBLICATIONS

Extended European Search Report for PCT/US2011/026475 dated May 23, 2014 received in the undersigned's office on Jun. 26, 2014.

*Primary Examiner* — Richard Torrente
*Assistant Examiner* — Irfan Habib
(74) *Attorney, Agent, or Firm* — Miller Patent Services; Jerry A. Miller (57) ABSTRACT

A method of transporting data within a DTV bit stream involves in a stream of digital video closed caption data packets, receiving closed caption text and a two bit extended packet control field; where the two bit extended packet control field has a value that designates that the information in cc_data_1 and cc_data_2 fields of the digital video closed caption data packets contain an extended packets within the digital video closed caption data packets; receiving the extended packets within the digital video closed caption data packets in the cc_data_1 and cc_data_2 fields that carry extended channel packets. This abstract is not to be considered limiting, since other embodiments may deviate from the features described in this abstract.

16 Claims, 6 Drawing Sheets

(56) References Cited

U.S. PATENT DOCUMENTS

| | | |
|---|---|---|
| 7,999,820 B1 | 8/2011 | Weitkemper et al. |
| 2005/0060758 A1 | 3/2005 | Park |
| 2006/0020959 A1* | 1/2006 | Masuda .................. 725/25 |
| 2006/0184994 A1* | 8/2006 | Eyer et al. ............... 725/136 |
| 2007/0022461 A1* | 1/2007 | Lee ........................ 725/135 |
| 2007/0076122 A1* | 4/2007 | Modi et al. .............. 348/465 |
| 2007/0180460 A1* | 8/2007 | Park ....................... 725/25 |
| 2008/0180572 A1* | 7/2008 | Pickett et al. ............ 348/468 |
| 2008/0225164 A1* | 9/2008 | Park ....................... 348/468 |
| 2008/0262996 A1* | 10/2008 | Yogeshwar et al. ....... 707/1 |
| 2009/0034633 A1* | 2/2009 | Rodirguez et al. ....... 375/240.28 |
| 2009/0060044 A1* | 3/2009 | Suh et al. ................ 375/240.16 |
| 2009/0128572 A1* | 5/2009 | MacInnis et al. ......... 345/519 |
| 2009/0185790 A1* | 7/2009 | Kim ........................ 386/95 |
| 2009/0204404 A1* | 8/2009 | Jarman et al. ........... 704/260 |
| 2009/0207305 A1* | 8/2009 | Fujita et al. ............. 348/468 |
| 2009/0228917 A1* | 9/2009 | Yun ........................ 725/33 |
| 2009/0231490 A1* | 9/2009 | Chen et al. .............. 348/468 |
| 2009/0244371 A1* | 10/2009 | Park ....................... 348/465 |
| 2009/0244372 A1* | 10/2009 | Petronelli et al. ......... 348/468 |
| 2009/0244373 A1* | 10/2009 | Park ....................... 348/468 |
| 2010/0002134 A1* | 1/2010 | Eyer et al. ............... 348/468 |
| 2010/0039558 A1* | 2/2010 | Detore .................... 348/468 |
| 2010/0157025 A1* | 6/2010 | Suh et al. ................ 348/51 |
| 2010/0188572 A1* | 7/2010 | Card, II .................. 348/468 |
| 2010/0225808 A1* | 9/2010 | Mears ..................... 348/468 |
| 2010/0238267 A1* | 9/2010 | Izzat et al. ............... 348/43 |
| 2011/0128351 A1 | 6/2011 | Newton |
| 2013/0016651 A1* | 1/2013 | Zhang et al. ............. 370/315 |

* cited by examiner

EXTENDED COMMAND STREAM FOR CLOSED CAPTION DISPARITY

CROSS REFERENCE TO RELATED DOCUMENTS

This application claims priority benefit of U.S. Provisional Patent Application No. 61/415,924 filed Nov. 22, 2010 entitled "Service Linkage to Caption Disparity Data Transport" to Mark Eyer, et al.; and this application claims priority benefit of U.S. Provisional Patent Applications Nos. 61/415,457 filed Nov. 19, 2010 entitled "Disparity Data Signaling and Transport for 3D Captioning" to Mark Eyer, et al.; 61/346,652 filed May 20, 2010 entitled "Disparity Data Transport" to Mark Eyer, et al.; and 61/313,612 filed Mar. 12, 2010 to Mark Eyer et al, and this application claims priority benefit of U.S. Provisional Patent Application No. 61/316,733 filed Mar. 23, 2010 entitled "Extended Command Stream for CEA-708 Captions" to Mark Eyer et al., and this application claims priority of U.S. Provisional Patent Application No. 61/378,792 filed Aug. 31, 2010 entitled "Efficient Transport of Frame-by-Frame Change in Captioning Disparity Data" to Mark Eyer; each of which is hereby incorporated by reference in their entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

When closed captions (CC) accompany a three dimensional (3D) stereoscopic video program, there is currently no standard that defines where the captions appear in the z-axis. In view of this, the captions may not be optimally placed on a video display so as to not interfere with other video objects or be interfered with by other video objects.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a program module, a script, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

When closed captioning is rendered in the display of a 3D video program, the CC window and associated text is likely to be rendered in the plane of the screen unless steps are taken to render the window and text such that they appear at a different, more appropriate, perceived depth. An object in a scene within 3D content may be presented such that it appears to the viewer to be some distance in front of the plane of the display screen. If a captioning window positioned in depth at the plane of the display were to be placed in front of that object, a "depth violation" would occur. In such a case, the viewer is presented with conflicting depth cues, a situation that causes eye fatigue and discomfort. Since captioning may intersect in the z-axis with content in the scene if it is simply positioned at the screen plane, the presentation of captioning is preferably individually authored to the subject matter of the video presentation. In order to accomplish this, extra information can be sent along with the captions to define the perceived placement on the z-axis (a designated distance in front or behind the plane of the screen) of a window containing the caption text for effective presentation and to avoid interference with objects in the scene. A number of techniques can be devised to provide this information, but many have disadvantages.

Stereoscopic 3D television involves delivery to the display screen of separate views for the left and right eyes, coupled with a method to allow each of the viewer's eyes to see only the image intended for that eye. The illusion of depth is achieved when, for a given object, the left- and right-eye views differ in the horizontal position of that object's placement. An overview of the basic technology relating to three dimensional display systems is described in "3D Display Systems" by Dr. Nick Holliman, Department of Computer Science, University of Durham, Science Laboratories, South Road, Durham DH1 3LE, UK (see particularly pp. 10-11 and FIG. 5), which is hereby incorporated by reference in the document's entirety.

The term "disparity" as used herein can be more formally referred to as "screen disparity" (i.e., as measured on the screen) as distinguished from "retinal disparity" and is defined as the difference of the physical x coordinates of corresponding points in the right and left images in a pair of aligned stereo images displayed on a screen. The less formal term "disparity" will be used herein for simplicity. By convention, when disparity is negative (e.g. when the left-eye image is rendered on the screen to the right of the right-eye image), the object is perceived as being in front of the plane of the screen. When disparity is positive (e.g. when the left-eye image is rendered on-screen to the left of the right-eye image), the object is perceived as being behind the screen plane.

The term "disparity data" can refer to any data indicating the disparity value to be used in rendering a given graphical object, such as a caption window and its associated text. The term can also be used more generally to refer to data reflecting the z-axis positions of objects in the current scene. The scene area can be mapped out into regions, with the z-axis position of the object in each region that is closest to the viewer recorded as a coordinate in the map. Such a map may be called a "disparity map" or a "depth map." Disparity maps can change on a frame-by-frame basis and can be represented in any number of ways. It is noted that disparity is a measure of the horizontal offset of left eye and right eye images, but the offset need not be in an integer number of pixels as fractional pixel offsets are perfectly acceptable.

Within the context of delivery of 3D video and CC content for display, disparity is generally represented as a percentage of the width of the accompanying video. As such, it is a dimensionless number. For example, the signaling scheme may specify that one unit of disparity is equal to $1/1920$ of the width of the video content (which is generally rendered to match the width of the display screen). But, a disparity of $1/1920$ is not the minimum increment in actual disparity even with a screen width of 1920. With this definition, a disparity of 7 refers to a distance equal to $7/1920$ of the width of the video content. Again with this definition, in the special case of a screen with 1920 pixels of horizontal resolution, this works out such that one full unit of disparity is the same width as one display pixel, but this should be thought of as a special case. If a display screen has fewer than 1920 horizontal pixels, e.g., 1600 horizontal pixels, then disparity is scaled accordingly and a disparity of 7 equates to $(7/1920)(1600)=5.83$ pixels. Hence, disparity should most properly be viewed as the difference in the physical location on the screen along the x axis (horizontal) of corresponding points in left eye and right eye images in a pair of aligned stereoscopic images. It is also noteworthy that the CC window will generally be a two dimensional window which is positioned along the z-axis and which is perceived to be in a plane parallel to the plane of the display screen.

As noted above, when closed captions (CC) accompany a three dimensional (3D) stereoscopic video program, the receiver of the receiver should be signaled as to where the captions are to be placed in the z-axis (depth dimension). The captions should be placed on a video display so as to not interfere with other video objects or be interfered with by other video objects. Accordingly, extra information may be sent with the captions to indicate their placement on the z-axis (in front or behind the screen), for effective presentation and to avoid interference with objects in the scene. The method described herein overcomes problems present with alternative delivery and transport methods. Hence, certain implementations consistent with embodiments of this invention pertain to the transport and format of data used for the rendering of captions over 3D video.

The transport method described herein is usable generally as a mechanism to deliver a variety of data, beyond 3D signaling, through the caption channel, as it is designed to be transparent to fielded (legacy) caption decoders. Hence, while example embodiments presented herein related to 3D disparity data, a variety of other data could be transported using the mechanisms described herein.

Proposed approaches have been presented to standards bodies of approaches to adding disparity data (to set the z-axis, or depth, for specific CEA-708 caption windows) into CEA-708 syntax. In one example, an extension mechanism called "EXT1" is used. The approach can provide disparity data for any given CEA-708 caption window. Unfortunately, this method has the following issues/problems:

The use of "EXT1" can cause problems in legacy decoders, which fail to properly parse it (unfortunate realities of poor implementations in the field).
   Caption authoring is preferably done only once, with the resulting stream being usable for both legacy (2D) decoders as well as 3D decoders.

Embodiments consistent with examples of the present invention address these problems as follows:

Data packets identified by legacy decoders as "padding" bytes are given new meaning by use of two reserved bits in the cc_data( ) data structure (see CEA-708-D Sec. 4.4). Legacy decoders discard these bytes as padding. New decoders can identify the two bytes as either 1) the start of an Extended Packet; 2) data bytes in an Extended Packet; 3) the end of an Extended Packet; or 4) actual padding data. The term "Extended Packet" is defined to refer to this method of redefinition of padding bytes as a form of extension to CEA-708. The sequence of Extended Packets may be referred to as the "Extended Channel." This extended channel, in addition to caption disparity could be used to carry any data including URLs, triggered declarative objects (TDOs), TDO triggers or any other suitable data without limitation.

In order to understand the mechanism of operation of example embodiments consistent with the present invention, it is useful to look at the currently pending CEA-708-D specification. The cc_data( ) structure is used to transport closed caption data inside picture user data for both MPEG-2 video and AVC video and is defined in Table 2 thereof, which is reproduced below.

CEA-708-D, Table 2:

TABLE 2

CEA-708-D,
Captioning Data Structure Syntax

| Syntax | No. of Bits | Format |
|---|---|---|
| cc_data( ) { | | |
| reserved | 1 | '1' |
| process_cc_data_flag | 1 | bslbf |
| zero_bit | 1 | '0' |
| cc_count | 5 | uimsbf |
| reserved | 8 | '1111 1111' |
| for ( i=0 ; i < cc_count ; i++ ) { | | |
| one_bit | 1 | '1' |
| reserved | 4 | '1111' |
| cc_valid | 1 | bslbf |
| cc_type | 2 | bslbf |
| cc_data_1 | 8 | bslbf |
| cc_data_2 | 8 | bslbf |
| } | | |
| } | | |

In accord with implementations consistent with the present invention, this table can be altered as shown below. Additionally, below appears a model for one example implementation for transport of disparity data from a broadcaster to a receiver. The exact format of the disparity data is not dictated by embodiments of the present invention and this transport mechanism can be used for transport of type of data. U.S. patent application Ser. No. 13/022,817 filed concurrently herewith on Feb. 8, 2011 entitled "Disparity Data Transport and Signaling" to Eyer, et al., and incorporated herein by reference discloses an optimized and efficient mechanism for encoding authored disparity data which can be transported using the structure described herein, but this should not be considered limiting.

Model Standard

A standard specification may be modeled on the information provided below:

TABLE A

CEA-708-D
Modified Captioning Data Structure Syntax

| Syntax | No. of Bits | Format |
|---|---|---|
| cc_data( ) { | | |
| reserved | 1 | '1' |
| process_cc_data_flag | 1 | bslbf |
| zero_bit | 1 | '0' |
| cc_count | 5 | uimsbf |
| reserved | 8 | '1111 1111' |
| for ( i=0 ; i < cc_count ; i++ ) { | | |
| one_bit | 1 | '1' |
| reserved | 2 | '11' |
| extended_packet_control | 2 | bslbf |
| cc_valid | 1 | bslbf |
| cc_type | 2 | bslbf |
| cc_data_1 | 8 | bslbf |
| cc_data_2 | 8 | bslbf |
| } | | |
| } | | |

In this modification, two of the four bits in the reserved field inside the "for" loop are defined as follows:

extended_packet_control—This two-bit field shall indicate the meaning of cc_data_1 and cc_data_2 when cc_valid='0' and cc_type='00', according to the following table. When either cc_valid is not equal to '1' or cc_type is not equal to '00', extended_packet_control shall carry no defined meaning.

TABLE B

Extended Packet Control Coding

| extended_packet_control | Meaning of cc_data_1 | Meaning of cc_data_2 |
|---|---|---|
| 00 | Reserved | Reserved |
| 01 | Start of Extended Packet | Extended Packet Data |
| 10 | Extended Packet Data | Extended Packet Data |
| 11 | Padding | Padding |

The following table is adapted from CEA-708-D Table 7 "cc_data( ) structure Example," showing how the "padding" bytes can now represent packets of the Extended Packet Data stream. EPC=extended_packet_control.

| i + 1 | cc_valid | cc_type | EPC | cc_data_1 | cc_data_2 |
|---|---|---|---|---|---|
| 1 | 1 | 00 | xx | CEA-608 datastream, field 1 | CEA-608 datastream, field 1 |
| 2 | 1 | 01 | xx | CEA-608 datastream, field 2 | CEA-608 datastream, field 2 |
| 3 | 0 | 11 | xx | 0xXX = END OF PACKET | 0xXX = END OF PACKET |
| 4 | 0 | 00 | 01 | Start of Extended Packet | Extended Packet Data |
| 5 | 1 | 11 | xx | byte#1: DTVCC Packet Header4 | byte#2: DTVCC Packet Data |
| 6 | 0 | 00 | 10 | Extended Packet Data | Extended Packet Data |
| 7 | 1 | 10 | xx | byte#3: DTVCC Packet Data | byte#4: DTVCC Packet Data |
| 8 | 0 | 00 | 10 | Extended Packet Data | Extended Packet Data |

-continued

| i + 1 | cc_valid | cc_type | EPC | cc_data_1 | cc_data_2 |
|---|---|---|---|---|---|
| 9 | 0 | 00 | 11 | Padding | Padding |
| ... | | | | | |
| 20 | 0 | 11 | xx | byte#5: DTVCC Packet Data | byte#6: DTVCC Packet Data |

In one example embodiment, the Extended Command structure is defined as a tag-length-data structure as shown in Table C below:

TABLE C

Extended Command Syntax

| ext_cmd( ) {  |   |        |
|---|---|---|
| ext_cmd_tag | 3 | uimsbf |
| if (ext_cmd_tag != '111') { | | |
| ext_cmd_length | 5 | uimsbf |
| } else { | | |
| ext_cmd_tag2 | 5 | uimsbf |
| ext_cmd_length2 | 8 | uimsbf |
| if ext_cmd_tag == '001' { | | |
| caption_disparity_data( ) | | |
| } else { | | |
| reserved | | |
| } | | |
| } | | | ext_cmd_tag—This 3-bit unsigned integer value in the range 0 to 7 shall indicate the structure of the data contained in this ext_cmd( ) packet. Value '001' shall indicate the packet carries caption_disparity_dataQ. Value '111' shall indicate the command type and length shall be indicated in ext_cmd_tag2 and ext_cmd_length2, respectively. Other values shall be considered as reserved for future use.

ext_cmd_length—This 5-bit unsigned integer value shall indicate the length in bytes of the extended command indicated in ext_cmd_tag, starting with the byte just following ext_cmd_length.

ext_cmd_tag2—This 5-bit unsigned integer shall indicate the structure of the data contained in this ext_cmd( ) packet. All values shall be considered as reserved for future use.

ext_cmd_length2—This 8-bit unsigned integer value shall indicate the length in bytes of the extended command indicated in ext_cmd_tag, starting with the byte just following ext_cmd_length2.

In one example embodiment, the Caption Disparity Data syntax can be as defined in Table D below:

TABLE D

Caption Disparity Data Syntax

| Syntax | No. of Bits | Format |
|---|---|---|
| caption_disparity_data( ) { | | |
| service_number | 4 | uimsbf |
| caption_window_count | 3 | uimsbf |
| marker_bit | 1 | '1' |
| if (service_number = 0xF) { | | |
| reserved | 2 | '11' |
| extended_service_number | 6 | bslbf |
| } | | |
| for ( i=0 ; i < caption_window_count; i++ ) { | | |
| caption_window_id[i] | 3 | uimsbf |
| temporal_extension_flag | 1 | bslbf |
| data_valid | 1 | bslbf |
| select_view_shift | 2 | bslbf |

TABLE D-continued

Caption Disparity Data Syntax

| Syntax | No. of Bits | Format |
|---|---|---|
| disparity[i] | 9 | simsbf |
| if (temporal_extension_flag) { | | |
| offset_precision | 1 | bslbf |
| marker_bit | 1 | '1' |
| for (k=0; k<11; k++) { | | |
| offset_sequence[i,k] | 2 | bslbf |
| } | | |
| } | | |
| } | | |
| } | | | service_number—This 4-bit unsigned integer value in the range zero to 15, when in the range 1 to 14, shall indicate the CEA-708 caption service number associated with this set of disparity data. Value zero shall indicate the included disparity data applies equally to all caption services. (E.g. disparity data given for window N applies to window N in each service present in the caption stream.) Value 15 shall indicate the service number is in the range 15-63, and shall be specified in the extended_service_number field.

extended_service_number—This 6-bit unsigned integer value in the range 15 to 63 shall indicate the CEA-708 caption service number associated with this set of disparity data.

caption_window_count—This 6-bit unsigned integer value in the range one to 63 shall indicate the number of sets of disparity data present in this caption_disparity_data( ) instance.

caption_window_id[i]—This 3-bit unsigned integer value in the range zero to 7 shall indicate the CEA-708 caption window ID for which disparity data in this instance of the "for" loop applies.

temporal_extension_flag—This one-bit flag shall indicate, when set to '1', that temporal extension data is included in this instance of the caption_window_count "for" loop. A value of '0' in temporal_extension_flag shall indicate no temporal extension data is included in this instance of the caption_window_count "for" loop.

data_valid—This one-bit flag shall indicate, when set to '0', that the disparity[i] data, select_view_shift and temporal extension data to follow (if present) have no meaning. When data valid is set to '1', the disparity[i] data (and temporal extension data to follow, if present) shall have meaning. Note: data_valid='0' may be used to create place-holder user data in the multiplex, up-stream of insertion of valid disparity data.

select_view_shift—This 2-bit quantity shall specify the method used to apply the disparity to the Left and Right views, according to the following table.

Description

Figure 1:
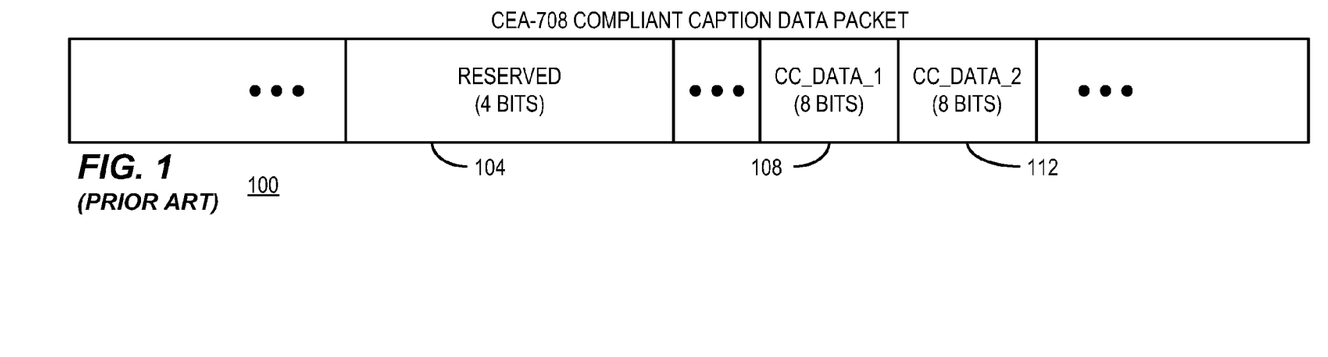
FIG. 1 is a depiction of caption data packets as specified in certain versions of CEA-708.

In the above model standard, caption disparity data is transported in modified CEA-708 compliant caption data packets. Turning now to FIG. 1, an example of such a data packet is depicted (as defined by the pseudocode in Table 2 as described above). In this packet format 100, four reserved bits 104 are provided along with two eight-bit bytes of closed caption data called cc_data__1 and cc_data__2 as defined in the specification and as depicted as 108 and 112.

Figure 2:
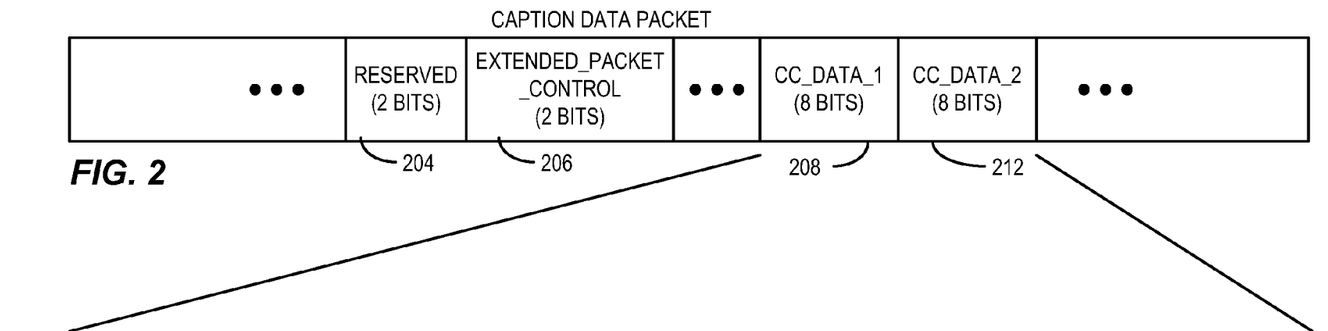
FIG. 2 is an example depiction of caption data packets of example implementations consistent with certain embodiments of the present invention.

In accord with implementations consistent with the present invention, the four reserved bits are repurposed so that only two of the bits remain reserved as 204 as depicted in FIG. 2. The other two bits are used as extended packet control bits 206 that determine the contents of an extended packet carried by the cc_data__1 and cc_data__2 bytes 208 and 212.

In this stream of digital video closed caption data packets, the two-bit extended packet control field can take on a value as indicated in the table above that designates that the information in cc_data__1 and cc_data__2 fields of the digital video closed caption data packets contain Extended Packets within the digital video closed caption data packets. The Extended Packets within the digital video closed caption data packets in the cc_data__1 and cc_data__2 fields can carry data such as disparity data designating the placement of closed caption windows along a Z axis when the closed caption text is displayed on a three dimensional display. The meaning of the cc_data__1 field can take on one of a reserved field, a start of an Extended Packet, Extended Packet data and padding based upon the value of the extended_packet_control field. Similarly, the extended packet further has an extended command tag. A certain value of this command tag designates that the extended packet contains caption disparity data. The cc_data__1 field can also be a DTVCC packet header or DTVCC data byte, but these are not controlled by the Extended Packet Control (EPC).

The meaning of the cc_data__2 field can take on one of a reserved field, Extended Packet data and padding based upon the value of the extended_packet_control field. Disparity data is encoded at an encoding device which outputs a video signal for display on the three dimensional display such that the closed caption window and text is positioned on the Z axis at a position designated by the disparity data.

Figure 3:
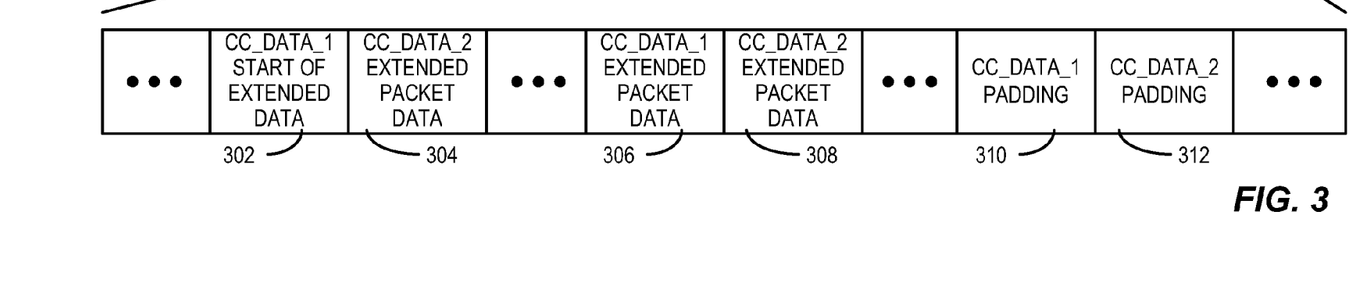
FIG. 3 is an example depiction of a sequence of data packets consistent with example implementations of certain embodiments of the present invention.

FIG. 3 depicts a stream of bytes made up of data taken from a sequence of several caption data packets. As shown in the example, packet 302 is the start of the extended closed caption disparity data and 304 a continuation of the disparity data. Further disparity data continues with packets 306 and 308 which carry the disparity data and so on until the message is completed, at which point the cc_data__1 and cc_data__2 words may contain only actual padding at 310 and 312.

Figure 4:
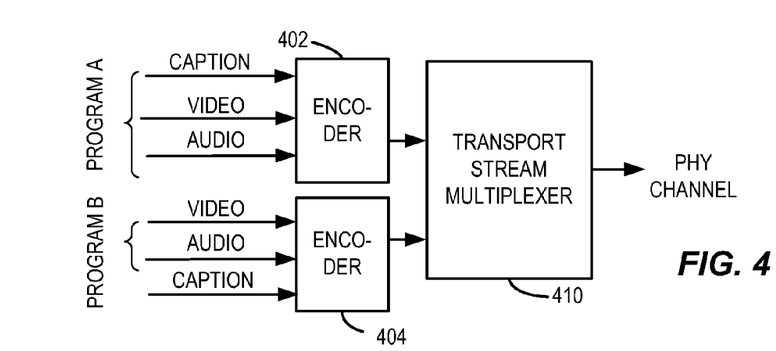
FIG. 4 is an example encoder consistent with certain embodiments of the present invention.

Referring now to FIG. 4, a basic diagram of a service provider such as a broadcaster is depicted. Generally speaking, a single service provider may provide multiple programs over one or more transport streams. The audio, video and caption data are provided to an encoder which encodes the data into packets suitable for distribution, including caption data packets as described above. As shown, Program A and Program B are encoded by encoders 402 and 404 which are then provided to a transport stream multiplexer 410 which then provides an output that can be distributed via a physical channel medium such as cable or satellite broadcast.

Figure 5:
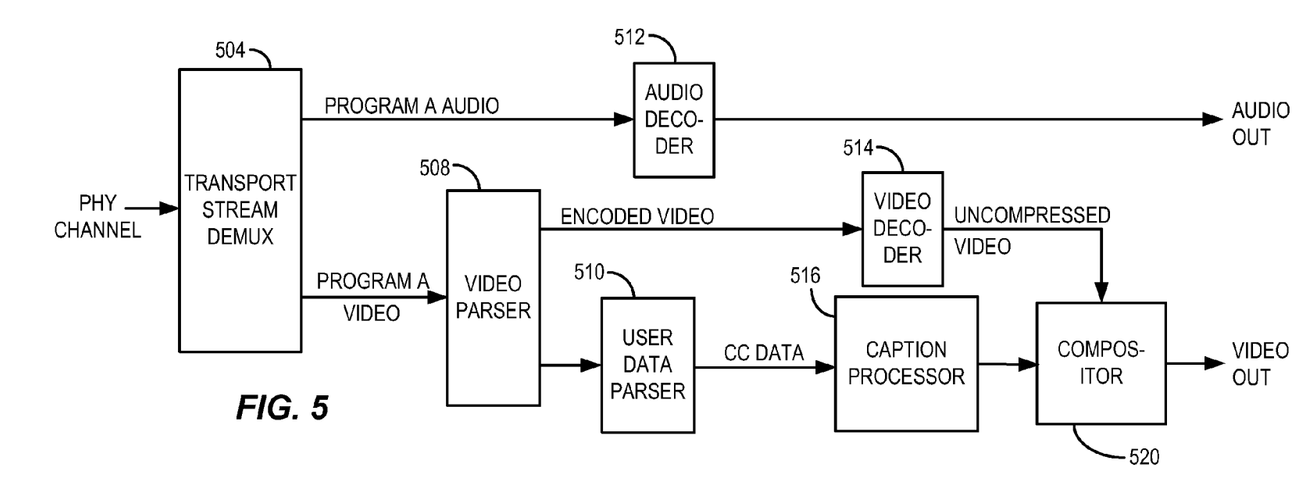
FIG. 5 is an example decoder consistent with certain embodiments of the present invention.

This encoded data from the physical channel is received at a television receiver device (e.g., a television or a set top box) as depicted in FIG. 5. The transport stream is demultiplexed at transport stream demultiplexer 504 to produce Transport Stream packets including audio and video packet streams corresponding to one program (as well as possibly other data not shown). Demultiplexer 512 selects an audio stream from the program of interests and delivers audio packets to audio decoder 512 which produces audio data as an output. Transport stream demultiplexer 504 selects video packets from the program of interest and sends them to video parser 508. Video parser 508 processes the video, sending the encoded video stream to video decoder 514 for decoding. Video parser 508 separates user data from the video packets and sends it to user data parser 510. From all the types of user data that may be present, user data parser selects CC data and sends it to caption processor 516. The closed caption data is processed at a caption processor 516, which parses out the caption text and the disparity data that defines the z-plane position of the caption text and its associated window. The caption data is then composited at compositor 520 with the video data output from video decoder 514 so as to produce 3D video with captions placed according to the data in the caption data packets in the x, y and z plane. Such data may place the captions in a static manner or dynamically (moving in the z-axis over time) in according with the authoring of the caption data.

Figure 6:
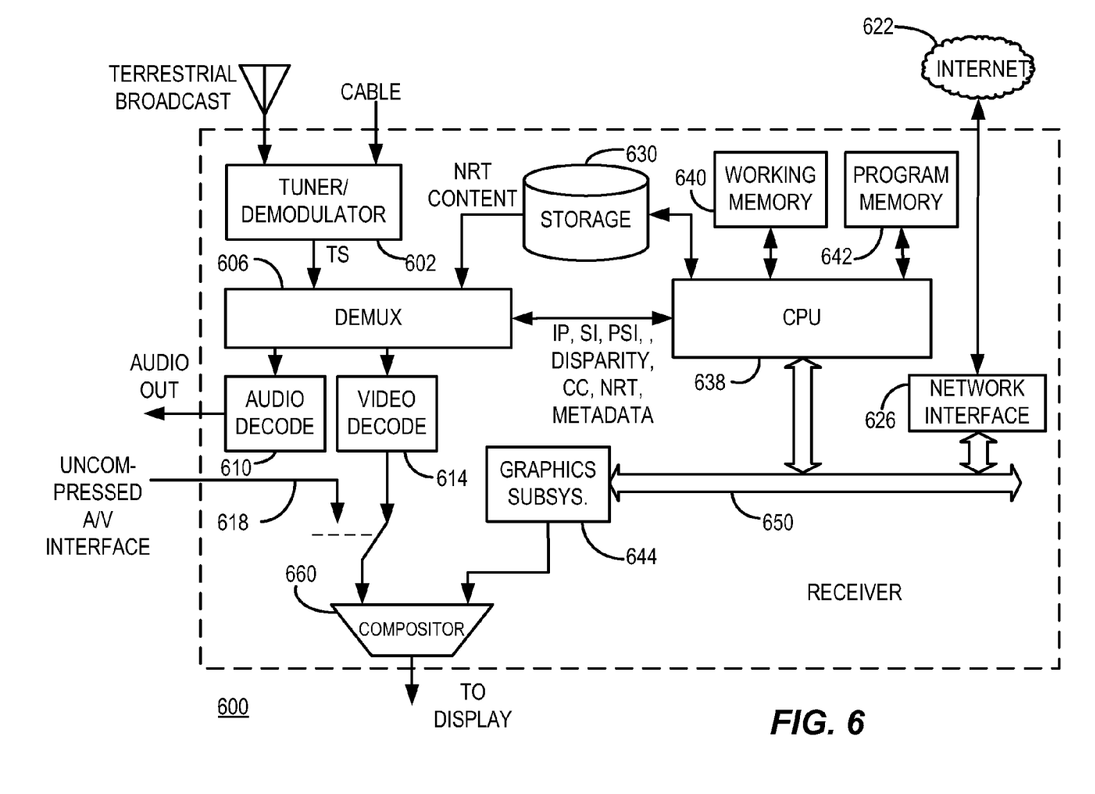
FIG. 6 is an example television receiver device consistent with certain embodiments of the present invention.

A receiver device is depicted in greater detail in FIG. 6 wherein content is received via any suitable source such as terrestrial broadcast, cable or satellite at a receiver 600's tuner/demodulator 602. The transport stream from the tuner/demodulator 602 is demultiplexed at demultiplexer 606 into audio and video streams. The audio is decoded at an audio decoder 610 while the video is decoded at a video decoder 614. Uncompressed A/V data may also be received via an uncompressed A/V interface 618 that can be selectively utilized.

A/V content may also be received via the Internet 622 via a network interface 626 for IP television content decoding. Additionally, storage 630 can be provided for non-real time (NRT) stored content. The NRT content can be played by demultiplexing at 606 in a manner similar to that of other sources of content. The receiver generally operates under control of a processor such as CPU 638 which is interconnected to working memory 640 and program memory 642 as well as a graphics subsystem 644 via one or more buses such as 650.

The CPU 638 receives closed caption data from the demultiplexer 606 as well as the disparity data via the caption data packets as described above and determines by parsing the data what z-position as well as x and y position to locate the caption data. This information is passed to the graphics subsystem 644 and the images are composited at the compositor 660 to produce an output suitable for processing and display on a video display.

Figure 7:
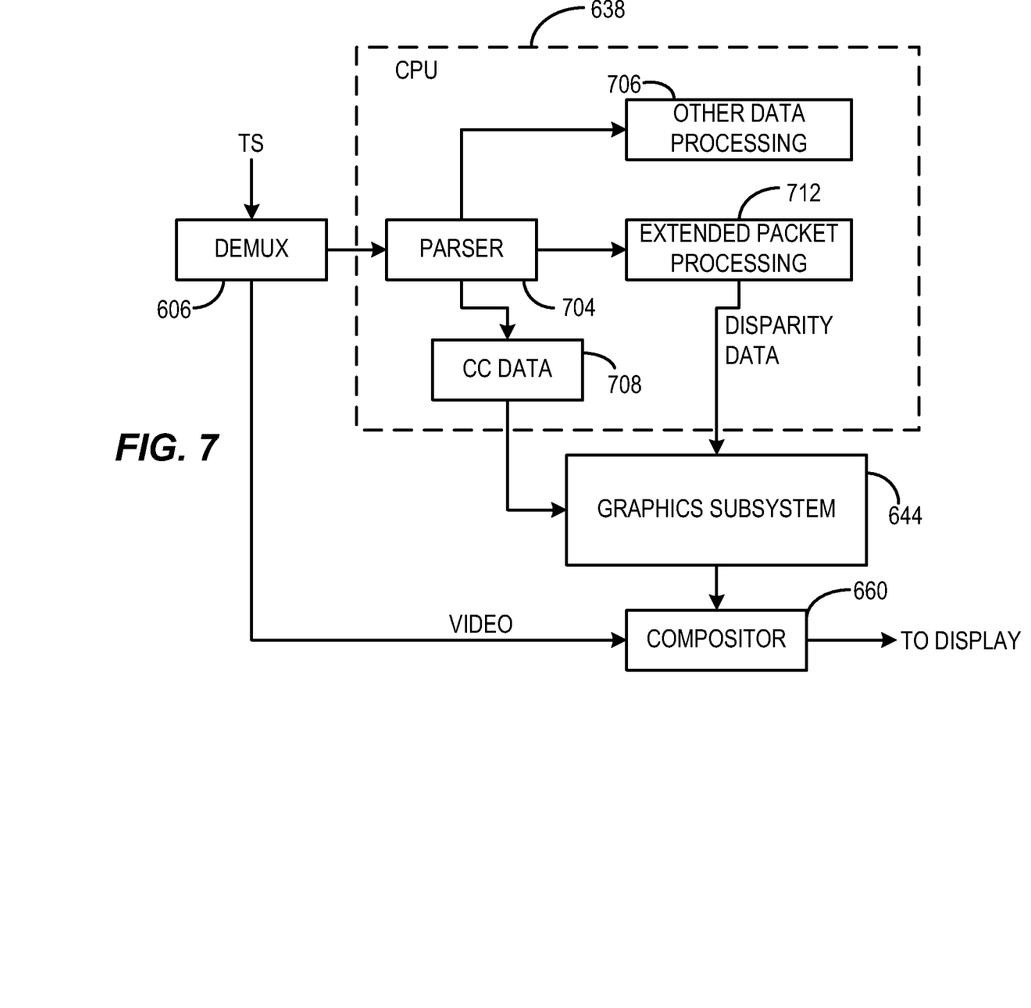
FIG. 7 is an example block diagram depicting the various operations of a processor consistent with certain embodiments of the present invention.

FIG. 7 depicts one implementation of the program modules used to process the caption data supplied in the manner described herein. In this example implementation, the CPU 638 operating under program control from program memory 642 and using working memory 640 receives the demultiplexed transport stream from demultiplexer 606 and a parser module 704 produces the caption data (that is, the caption text) at 708 and sends the extended packet data to extended packet processing module 712 where the disparity data are extracted for use by the graphics subsystem 644 for processing. Other data may be parsed by parser 704 to other data processing modules as indicated by 706. The processed caption data are then composited at compositor 660 with the video data from the demultiplexer 606 to produce data for display with the position of the CC data positioned as specified in the z-axis.

Thus, a television receiver device such as 600 that processes extended channel data has a decoder arrangement that receives a stream of digital video closed caption data packets, receiving closed caption text and a two bit extended packet control field. The two bit extended packet control field has a value that designates that the information in cc_data__1 and cc_data_2 fields of the digital video closed caption data packets contain an extended packets within the digital video closed caption data packets. The decoder receives the extended packets within the digital video closed caption data packets in the cc_data_1 and cc_data_2 fields that carry extended channel data.

In accord with certain implementations, the extended channel data carries disparity data designating the placement of closed caption text along a Z axis when the closed caption text is displayed on a three dimensional display. A compositor such as 660 receives and processes the disparity data and the caption text to produce an output suitable for defining a rendering of a three dimensional image on a display of the caption text at a z-axis position defined by the disparity data. In accord with certain implementations, the meaning of the cc_data_1 field can take on one of a reserved field, a start of an extended data packet, extended packet data and padding based upon the value of the extended packet control field, and the meaning of the cc_data_2 field can take on one of a reserved field, extended packet data and padding based upon the value of the extended packet control field.

In accord with certain implementations, the closed caption text is displayed on a display with the closed caption text positioned on the Z axis at the position designated by the disparity data. In accord with certain implementations, the extended packet further has an extended command tag that designates that the extended packet contains caption disparity data.

In certain implementations, a television receiver device that processes disparity data for closed captions has a decoder that receives a stream of digital video closed caption data packets, receiving closed caption tex and a two bit extended packet control field. The two bit extended packet control field has a value that designates that the information in cc_data_1 and cc_data_2 fields of the digital video closed caption data packets contain an extended packets within the digital video closed caption data packets. The meaning of the cc_data_1 field can take on one of a reserved field, a start of an extended data packet, extended packet data and padding based upon the value of the extended packet control field. The meaning of the cc_data_2 field can take on one of a reserved field, extended packet data and padding based upon the value of the extended packet control field. The decoder further receiving the extended packets within the digital video closed caption data packets in the cc_data_1 and cc_data_2 fields that carry disparity data designating the placement of closed caption text along a Z axis when the closed caption text is displayed on a three dimensional display. The extended packet further comprises a extended command tag that designates that the extended packet contains caption disparity data. A compositor receives and processes the disparity data and the caption text to produce an output suitable for defining a rendering of a three dimensional image on a display of the caption text at a z-axis position defined by the disparity data. The display displays the closed caption text on the display with the closed caption text positioned on the Z axis at the position designated by the disparity data.

Figure 8:
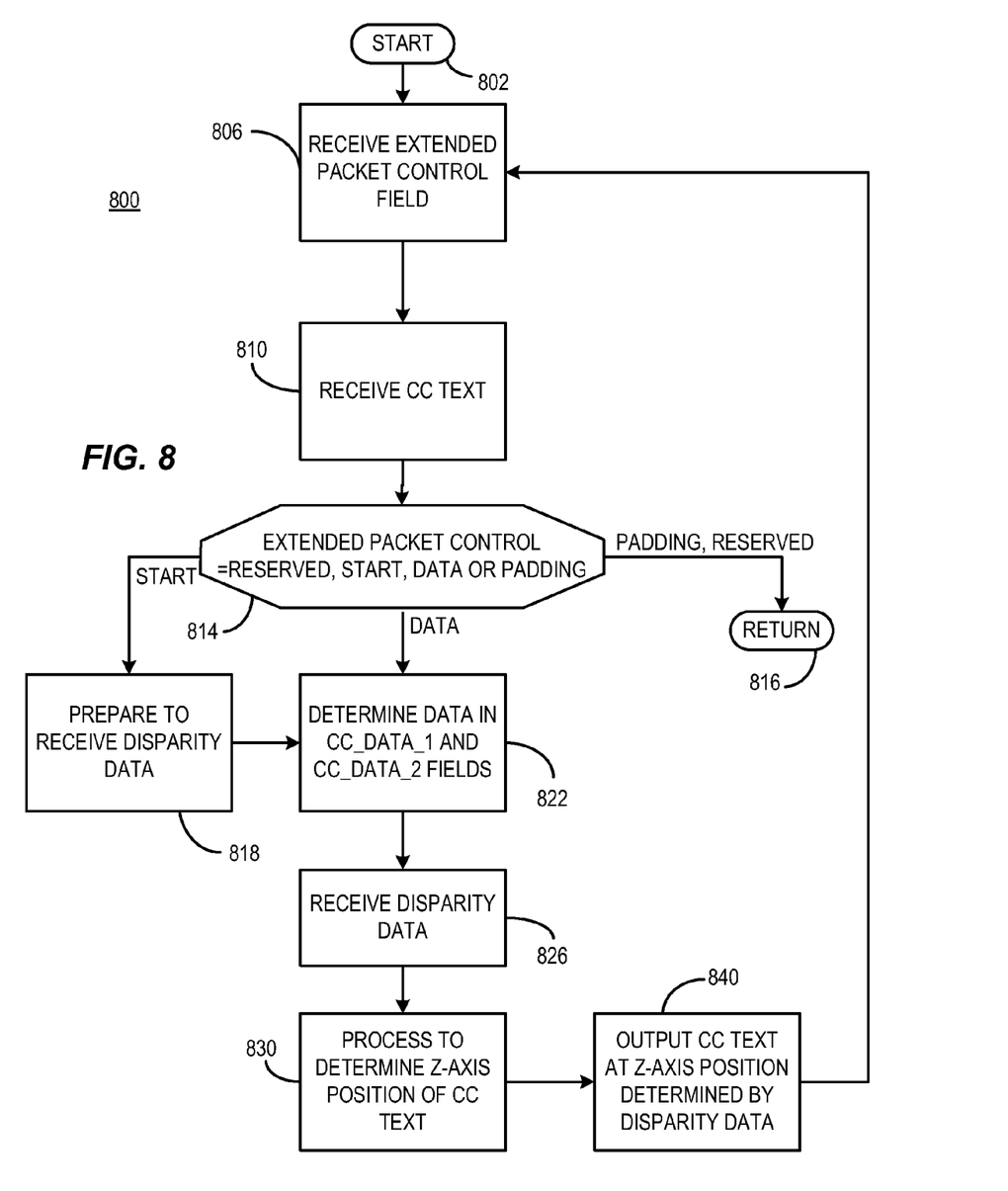
FIG. 8 is an example flow chart of a process consistent with certain embodiments of the present invention.

An overall process consistent with example implementations of the current invention is depicted in the flow chart 800 of FIG. 8 starting at 802. At 806, a caption data packet is received containing an extended packet control field and the closed caption text is received at 810. It will be understood that these events are a continuous flow with text and caption data being received on an ongoing basis, so that the present representation is not to be construed as accurately depicting time. At 814, the process 800 reads the extended packet control bits to determine how to interpret the data in cc_data_1 and cc_data_2. If the extended packet control bits indicate that the data is padding or reserved bits, then the process knows there is no disparity data to read and returns at 816. If the extended packet control bits indicate the start of disparity data, then the receiver prepares to receive disparity data at 818 and begins to interpret the data in cc_data_1 and cc_data_2 as disparity data at 822. As long as the extended packet control bits indicate disparity data are present in cc_data_1 and cc_data_2, the process continues to retrieve the data at 826. This data is processed to determine the z-axis position of the closed caption text and the closed caption window containing the text at 830 and is then output to produce composited display data at 840. The process continues to receive closed caption text and disparity data until the end of the disparity data as signified by padding as indicated in 814.

Thus, a method of transporting data within a DTV bit stream involves, in a stream of digital video closed caption data packets, receiving closed caption text and a two bit extended packet control field. The two bit extended packet control field has a value that designates that the information in cc_data_1 and cc_data_2 fields of the digital video closed caption data packets contain extended channel packets within the digital video closed caption data packets. The method further involves receiving the extended packets within the digital video closed caption data packets in the cc_data_1 and cc_data_2 fields that carry extended channel data, where the meaning of the cc_data_1 field can take on one of a reserved field, a start of an extended data packet, extended packet data and padding based upon the value of the extended packet control field and where the extended packet further comprises a extended command tag that designate that the extended packet contains caption disparity data. The cc_data_1 field can also be a DTVCC packet header or DTVCC data byte, but these are not controlled by the EPC. The meaning of the cc_data_2 field can take on one of a reserved field, extended packet data and padding based upon the value of the extended packet control field. The video signal is output for display on the three dimensional display such that the closed caption text is positioned on the Z axis at a position designated by the disparity data.

In accord with certain implementations, the extended channel carries disparity data designating the placement of closed caption text along a Z axis when the closed caption text is displayed on a three dimensional display. In accord with certain implementations, the method further involves displaying the closed caption text on the display with the closed caption text positioned on the Z axis at the position designated by the disparity data.

Another method of transporting data within a DTV bit stream involves receiving in a stream of digital video closed caption data packets closed caption text and a two bit extended packet control field. The two bit extended packet control field has a value that designates that the information in cc_data_1 and cc_data_2 fields of the digital video closed caption data packets contain an extended packets within the digital video closed caption data packets. The extended packets are received within the digital video closed caption data packets in the cc_data_1 and cc_data_2 fields that carry extended channel packets.

In accord with certain implementations, the meaning of the cc_data_1 field can take on one of a reserved field, a start of an extended data packet, extended packet data and padding based upon the value of the extended packet control field and the meaning of the cc_data_2 field can take on one of a reserved field, extended packet data and padding based upon the value of the extended packet control field. In accord with certain implementations, the extended channel packets carry disparity data designating the placement of closed caption text along a Z axis when the closed caption text is displayed on a three dimensional display.

In accord with certain implementations the method further involves displaying the closed caption text on the display with the closed caption text positioned on the Z axis at the position designated by the disparity data. In accord with certain implementations, the extended packet further comprises a extended command tag that designates that the extended packet contains caption disparity data.

Any of the above methods can utilize an electronic storage device such as a non-transitory electronic storage medium for storing instructions that when executed on one or more processors carry out the method.

Figure 9:
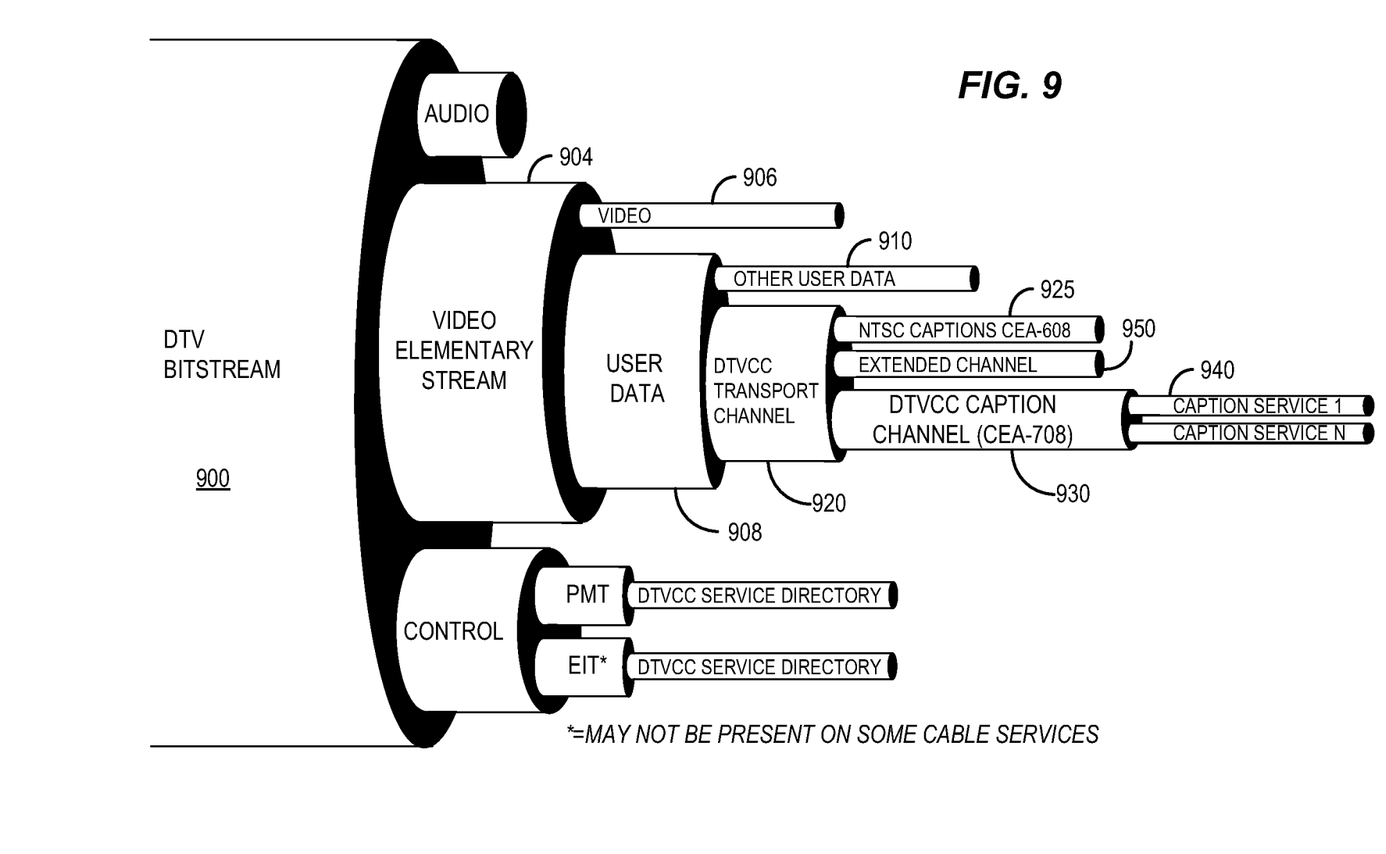
FIG. 9 is an illustration depicting the structure of the DTV bitstream as a number of nested "data pipes" in a manner consistent with certain embodiments of the present invention.

FIG. 9 depicts the structure of the DTV bitstream as a number of nested "data pipes." Within DTV bitstream 900, which can be structured as an MPEG-2 Transport Stream (see ISO/IEC 13818-1 MPEG-2 Systems) are a sequence of 188-byte Transport Stream packets. Some packets contain control information, some contain audio, and some contain video. The video Elementary Stream (ES) 904 includes the compressed video stream itself 906, as well as user data packets 908. Within the user data packets 908 may be found closed captioning data: the DTVCC transport channel 920. Other user data 910 may also be present. Within the DTVCC transport channel 920, is carried NTSC captions 925 encoded according to CEA 608 and the DTVCC caption channel 930 carrying caption data encoded according to CEA-708. In accordance with the present invention, the Extended Channel 950 is also carried inside the DTVCC transport channel 920. One or more caption services 940 are transported within DTVCC caption channel 930.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of transporting data within a DTV bit stream, comprising:

in a stream of digital video closed caption data packets, receiving closed caption text and a two bit extended packet control field;

where the closed caption text and the two bit extended packet control field reside in a CEA-708-D compliant cc_data( ) data structure, with the two bit extended packet control field occupying two of the four consecutive reserved bits in the four bit reserved field imbedded in the for-loop of the CEA 708-D compliant cc_data( ) data structure;

where the two bit extended packet control field has a value that designates that the information in cc_data__1 and cc_data__2 fields of the digital video closed caption data packets contain extended channel packets within the digital video closed caption data packets;

receiving the extended packets within the digital video closed caption data packets in the cc_data__1 and cc_data__2 fields that carry extended channel data;

where the meaning of the cc_data__1 field can take on one of a reserved field, a start of an extended data packet, extended packet data and padding based upon the value of the extended packet control field;

where the extended packet further comprises an extended command tag that designates that the extended packet contains caption disparity data;

where the meaning of the cc_data__2 field can take on one of a reserved field, extended packet data and padding based upon the value of the extended packet control field;

outputting a video signal for display on the three dimensional display such that the closed caption text is positioned on the Z axis at a position designated by the disparity data.

2. The method according to claim 1 where the extended channel carries disparity data designating the placement of closed caption text along a Z axis when the closed caption text is displayed on a three dimensional display.

3. The method according to claim 2, further comprising displaying the closed caption text on the display with the closed caption text positioned on the Z axis at the position designated by the disparity data.

4. A method of transporting data within a DTV bit stream, comprising:

in a stream of digital video closed caption data packets, receiving closed caption text and a two bit extended packet control field;

where the closed caption text and the two bit extended packet control field reside in a CEA 708-D compliant cc_data( ) data structure, with the two bit extended packet control field occupying two of the four consecutive reserved bits in the four bit reserved field imbedded in the for-loop of the CEA 708-D compliant cc_data( ) data structure;

where the two bit extended packet control field has a value that designates that the information in cc_data_1 and cc_data_2 fields of the digital video closed caption data packets contain an extended packets within the digital video closed caption data packets;

receiving the extended packets within the digital video closed caption data packets in the cc_data_1 and cc_data_2 fields that carry extended channel packets.

5. The method according to claim 4, where the meaning of the cc_data_1 field can take on one of a reserved field, a start of an extended data packet, extended packet data and padding based upon the value of the extended packet control field; and where the meaning of the cc_data_2 field can take on one of a reserved field, extended packet data and padding based upon the value of the extended packet control field.

6. The method according to claim 4 where the extended channel packets carry disparity data designating the placement of closed caption text along a Z axis when the closed caption text is displayed on a three dimensional display.

7. The method according to claim 6, further comprising displaying the closed caption text on the display with the closed caption text positioned on the Z axis at the position designated by the disparity data.

8. The method according to claim 6, where the extended packet further comprises a extended command tag that designates that the extended packet contains caption disparity data.

9. An electronic storage medium storing instructions that when executed on one or more processors carry out a method according to claim 4.

10. A television receiver device that processes extended channel data, comprising:

a decoder that receives a stream of digital video closed caption data packets, receiving closed caption text and a two bit extended packet control field;

where the closed caption text and the two bit extended packet control field reside in a CEA 708-D compliant cc_data( ) data structure, with the two bit extended packet control field occupying two of the four consecutive reserved bits in the four bit reserved field imbedded in the for-loop of the CEA-708-D compliant cc_data( ) data structure;

where the two bit extended packet control field has a value that designates that the information in cc_data_1 and cc_data_2 fields of the digital video closed caption data packets contain an extended packets within the digital video closed caption data packets;

the decoder further receiving the extended packets within the digital video closed caption data packets in the cc_data_1 and cc_data_2 fields that carry extended channel data.

11. The television receiver device according to claim 10 in which the extended channel data carries disparity data designating the placement of closed caption text along a Z axis when the closed caption text is displayed on a three dimensional display; and a compositor that receives and processes the disparity data and the caption text to produce an output suitable for defining a rendering of a three dimensional image on a display of the caption text at a z-axis position defined by the disparity data.

12. The device according to claim 10, where the meaning of the cc_data_1 field can take on one of a reserved field, a start of an extended data packet, extended packet data and padding based upon the value of the extended packet control field; and where the meaning of the cc_data_2 field can take on one of a reserved field, extended packet data and padding based upon the value of the extended packet control field.

13. The device according to claim 10, further comprising a display displaying the closed caption text on the display with the closed caption text positioned on the Z axis at the position designated by the disparity data.

14. The device according to claim 10, where the extended packet further comprises an extended command tag that designates that the extended packet contains caption disparity data.

15. The television receiver device according to claim 10 in which the extended channel data carries disparity data designating the placement of closed caption text along a Z axis when the closed caption text is displayed on a three dimensional display.

16. A television receiver device that processes disparity data for closed captions, comprising:

a decoder that receives a stream of digital video closed caption data packets, receiving closed caption text and a two bit extended packet control field;

where the closed caption text and the two bit extended packet control field reside in a CEA-708-D compliant cc_data( ) data structure, with the two bit extended packet control field occupying two of the four consecutive reserved bits in the four bit reserved field imbedded in the for-loop of the CEA-708-D compliant cc_data( ) data structure;

where the two bit extended packet control field has a value that designates that the information in cc_data_1 and cc_data_2 fields of the digital video closed caption data packets contain an extended packets within the digital video closed caption data packets;

where the meaning of the cc_data_1 field can take on one of a reserved field, a start of an extended data packet, extended packet data and padding based upon the value of the extended packet control field; and where the meaning of the cc_data_2 field can take on one of a reserved field, extended packet data and padding based upon the value of the extended packet control field;

the decoder further receiving the extended packets within the digital video closed caption data packets in the cc_data_1 and cc_data_2 fields that carry disparity data designating the placement of closed caption text along a Z axis when the closed caption text is displayed on a three dimensional display;

where the extended packet further comprises a extended command tag that designates that the extended packet contains caption disparity data;

a compositor that receives and processes the disparity data and the caption text to produce an output suitable for defining a rendering of a three dimensional image on a display of the caption text at a z-axis position defined by the disparity data;

the display displaying the closed caption text on the display with the closed caption text positioned on the Z axis at the position designated by the disparity data.

* * * * *